United States Patent
Hickey et al.

(10) Patent No.: US 10,261,793 B2
(45) Date of Patent: Apr. 16, 2019

(54) INSTRUCTION PREDICATION USING INSTRUCTION ADDRESS PATTERN MATCHING

(75) Inventors: Mark J. Hickey, Rochester, MN (US); Adam J. Muff, Rochester, MN (US); Matthew R. Tubbs, Rochester, MN (US); Charles D. Wait, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 1185 days.

(21) Appl. No.: 13/328,185

(22) Filed: Dec. 16, 2011

(65) Prior Publication Data

US 2013/0159683 A1    Jun. 20, 2013

(51) Int. Cl.
 *G06F 9/30* (2018.01)

(52) U.S. Cl.
 CPC ...... *G06F 9/30072* (2013.01); *G06F 9/30018* (2013.01)

(58) Field of Classification Search
 CPC .................................................. G06F 9/30072
 See application file for complete search history.

(56) References Cited

U.S. PATENT DOCUMENTS

| | | | |
|---|---|---|---|
| 6,353,883 B1 | 3/2002 | Grochowski et al. | |
| 6,397,301 B1* | 5/2002 | Quach et al. | 711/138 |
| 7,178,011 B2 | 2/2007 | Seal et al. | |
| 7,725,687 B2 | 5/2010 | Menon et al. | |
| 8,819,399 B1* | 8/2014 | Muth et al. | 712/234 |
| 2004/0250051 A1* | 12/2004 | Seal | G06F 9/30072 712/226 |
| 2005/0188185 A1 | 8/2005 | Grochowski | |
| 2006/0230093 A1 | 10/2006 | New et al. | |
| 2008/0040586 A1 | 2/2008 | Colavin et al. | |
| 2008/0235657 A1 | 9/2008 | Kim et al. | |

OTHER PUBLICATIONS

Fast Predicate-Aware Dataflow Analysis, IP.com Prior Art Database Disclosure (Source: IPCOM), Disclosure No. IPCOM000016504D, Jun. 26, 2003, 2 pages.
Stallings, Chapter 21. IA-64 Architecture (Think Intel Itanium) also known as (EPIC—Extremely Parallel Instruction Computing), faculty.washington.edu/Icrum/TCSS372AF09/14_IA64EPIC.ppt, Computer Organization and Architecture Designing for Performance, 2009, (38 pgs).
Method for predicate analysis, IP.com Prior Art Database Disclosure (Source: IPCOM), Disclosure No. IPCOM000007516D, Apr. 2, 2002, (12 pgs).
Quiñones et al., "Selective Predicate Prediction for Out-of-Order Processors," Proceedings of the 20th Annual International Conference on Supercomputing, ICS, Jun. 2006, (9 pgs).

(Continued)

*Primary Examiner* — John M Lindlof
(74) *Attorney, Agent, or Firm* — Patterson + Sheridan, LLP (57) ABSTRACT

A particular method includes receiving, at a processor, an instruction and an address of the instruction. The method also includes preventing execution of the instruction based at least in part on determining that the address is within a range of addresses.

18 Claims, 7 Drawing Sheets

(56) References Cited

OTHER PUBLICATIONS

Pnevmatikatos, "Incorporating Guarded Execution into Existing Instruction Sets," Doctoral Thesis, University of Wisconsin, Madison, 1996 http://citeseerx.ist.psu.edu/viewdoc/summary?doi=10.1.1.24.6088.
Blandford et al., "Exploring the Benefit of GUARD Instructions," CS740—Computer Architecture Class Projects, Carnegie Mellon School of Computer Science, 2001 http://www.cs.cmu.edu/afs/cs/academic/class/15740-f01/www/project_info/actual_projects.html.
Anido et al., "Improving the Operation Autonomy of SIMD Processing Elements by Using Guarded Instructions and Pseudo Branches," Proceedings of the Euromicro Symposium on Digital System Design, Dortmund, 2002 IEEE, ISBN 0-7695-1790-0/02 http://ieeexplore.ieee.org/xpls/abs_all.jsp?arnumber=1115363.
Ashmawy et al., "Hybrid Predication Model for Instruction Level Parallslism," International Proceedings of the Parallel and Distributed Processing Symposium, Abstracts and CD-ROM, Ft. Lauderdale, USA, 2002 IEEE, ISBN 0-07695-1573-8/02 http://ieeexplore.ieee.org/xpls/abs_all.jsp?arnumber=1015558.
Stephenson et al., "Lightweight Predication Support for Out of Order Processors," 15th International Symposium on High Performance Computer Architecture, HPCA 2009, 2009 IEEE, ISSN 1530-0897 http://ieeexplore.ieee.org/xpls/abs_all.jsp?arnumber=4798255.
SIPO Office Action dated Nov. 27, 2014.
Pnevmatikatos, Dionisios N. et al, "Guarded Execution and Branch Prediction in Dynamic ILP Processors", University of Wisconsin-Madison.

\* cited by examiner

INSTRUCTION PREDICATION USING INSTRUCTION ADDRESS PATTERN MATCHING

FIELD OF THE DISCLOSURE

The disclosure is generally related to instruction predication using instruction address pattern matching.

BACKGROUND

Instruction pipelining is a commonly used technique in the design of computers and other digital electronic devices to increase instruction throughput. The fundamental idea is to split the processing of an instruction into a series of independent steps. A basic five-stage instruction pipeline contains the following stages: Instruction Fetch, Instruction Decode, Execute, Memory Access, and Write Back. Instruction pipelining allows the instructions to be issued at the processing rate of the slowest step, which may be faster than the time needed to perform all the steps at once.

A branch instruction causes a program to conditionally branch to another section of program code. It is not known whether the branch will be taken until the branch instruction has been executed, so the "next" instruction cannot enter the Fetch stage until after the branch instruction has passed the Execute stage. One way to handle branch instructions in the presence of instruction pipelining is branch prediction, i.e., predicting whether the branch will be taken and fetching the next instruction based on the prediction. However, if it turns out that the branch has been mispredicted, all the instructions in the pipeline following the branch instruction have to be flushed and the correct instruction has to be fetched (typically referred to as "mispredict penalty").

Instruction predication enables an instruction to conditionally perform or do nothing. Thus, in the context of branch prediction, if a branch is mispredicted, the instructions in the pipeline after the branch can be "turned off" (e.g., treated like no-ops) instead of being flushed. Instruction predication is commonly accomplished by using predicate registers to store the value of the branch condition when the branch instruction passes the Execute stage. The predicate registers act like a third operand for an instruction. The instruction may be executed or ignored depending on the value in the predicate register. However, using predicate registers for instruction predication may require an additional predicate register field in the instruction format. Having an additional field in the instruction format may use valuable opcode and/or register address space in instruction words.

SUMMARY

According to one embodiment, a method includes receiving, at a processor, an instruction and an address of the instruction. The method also includes preventing execution of the instruction based at least in part on determining that the address is within a range of addresses.

In another particular embodiment, an apparatus includes a processor including a predication logic configured to receive an address of an instruction. The predication logic is also configured to prevent execution of the instruction based at least in part on determining that the address is within a range of addresses.

In yet another particular embodiment, a computer program product includes a computer readable storage medium having computer readable program code embodied therein. The computer readable program code is configured to receive an instruction and an address of the instruction. The computer readable program code is also configured to prevent execution of the instruction based at least in part on determining that the address is within a range of address based on whether one or more bits of the address match an addresses pattern corresponding to the range of addresses.

DETAILED DESCRIPTION

Systems and methods of performing instruction predication based on instruction address are disclosed. For example, the disclosed techniques may enable dynamic predication of particular instructions based on whether or not the instructions fall within a specified address range. Embodiments of the disclosure may utilize a set of instruction address mask, match, and count registers that together describe the specified address range and how long (e.g., for how many instructions) predication should be performed. The logic controlling the mask and match process may be executed quickly relative to a clock cycle time period, and thus may be done at instruction decode time. Thus, instruction predication may be achieved without use of dedicated predicate register bits in instruction formats, freeing up opcode space for other instructions, operands, and/or register addresses.

These and other advantages and features that characterize embodiments of the disclosure are set forth in the claims listed below. However, for a better understanding of the disclosure, and of the advantages and objectives attained through its use, reference should be made to the drawings and to the accompanying descriptive matter in which there are described exemplary embodiments of the disclosure.

Figure 1:
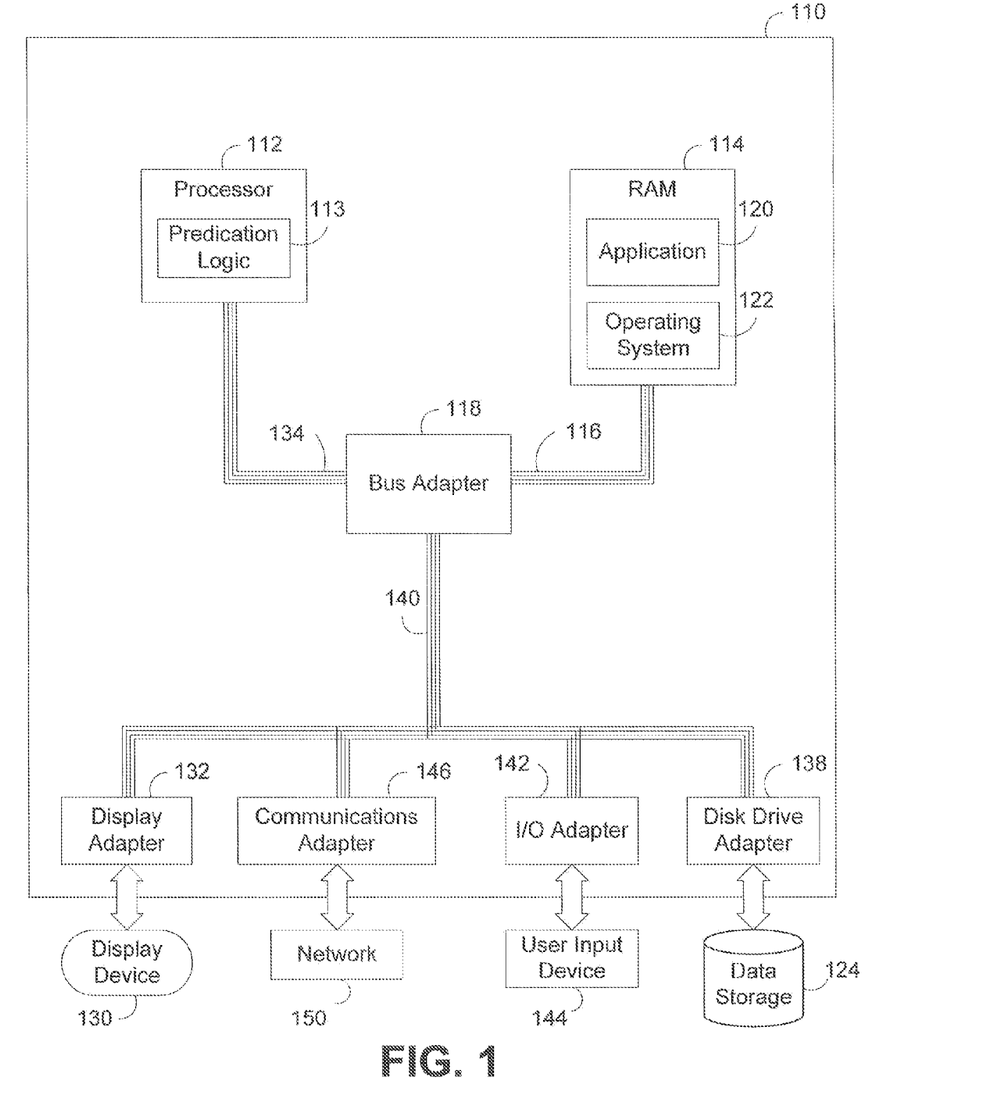
FIG. 1 is a block diagram of exemplary automated computing machinery including an exemplary computer useful in instruction predication consistent with disclosed embodiments.

Now turning to the drawings, where like numbers denote like parts throughout the several views, FIG. 1 illustrates exemplary automated computing machinery including a computer 110 operable to perform instruction predication consistent with disclosed embodiments. The computer 110 includes at least one computer processor (CPU) 112 as well as a random access memory ("RAM") 114, which is connected through a high speed memory bus 116 and a bus adapter 118 to the processor 112 through a processor bus 134.

The processor 112 includes predication logic 113. In a particular embodiment, the prediction logic 113 may enable the processor 112 to predicate instructions (e.g., determine whether to issue/execute the instructions as-is or treat the instructions as no-ops) based on addresses of the instructions. For example, when an instruction has an address that falls within a particular address range, the execution of the instruction may be predicated and the instruction may be treated as a no-op (e.g., a validity bit of the instruction may be de-asserted). When the instruction has an address that is outside the address range, the instruction may be issued and executed as-is. In a particular embodiment, the address range may be specified using match register(s), mask register(s), or any combination thereof, as further described with reference to FIG. 4.

Stored in the RAM 114 is an application 120, which may be a module of user-level computer program instructions for carrying out particular tasks (e.g., word processing, spreadsheets, database operations, video gaming, stock market simulations, graphics simulations, atomic quantum process simulations, or other user-level applications). Also stored in the RAM 114 is an operating system 122. Operating systems useful in connection with disclosed embodiments include, but are not limited to, UNIX® (a registered trademark of The Open Group), Linux® (a registered trademark of Linus Torvalds), Windows® (a registered trademark of Microsoft Corporation, Redmond, Wash., United States), AIX (a registered trademark of International Business Machines (IBM) Corp., Armonk, N.Y., United States) i5/OS® (a registered trademark of IBM Corp.), and others as will occur to those of skill in the art. The operating system 122 and the application 120 in the example of FIG. 1 are shown in RAM 114, but components of such software may also, or in addition, be stored in non-volatile memory (e.g., on data storage, such as illustrative data storage 124).

The computer 110 includes a disk drive adapter 138 coupled through an expansion bus 140 and a bus adapter 118 to the processor 112 and other components of the computer 110. The disk drive adapter 138 connects non-volatile data storage to the computer 110 in the form of the data storage 124, and may be implemented, for example, using Integrated Drive Electronics ("IDE") adapters, Small Computer System Interface ("SCSI") adapters, and others as will occur to those of skill in the art. Non-volatile computer memory also may be implemented for as an optical disk drive, electrically erasable programmable read-only memory (so-called "EEPROM" or "Flash" memory), RAM drives, and so on, as will occur to those of skill in the art.

The computer 110 also includes one or more input/output ("I/O") adapters 142, which implement user-oriented input/output through, for example, software drivers and computer hardware for controlling input and output to and from user input devices 144, such as keyboards and mice. In addition, the computer 110 includes a communications adapter 146 for data communications with a data communications network 150. Such data communications may be carried out serially through Recommended Standard 232 (RS-232) connections (sometimes referred to as "serial" connections), through external buses such as a Universal Serial Bus ("USB"), through data communications networks such as internet protocol (IP) data communications networks, and in other ways as will occur to those of skill in the art. The communications adapter 146 implements the hardware level of data communications through which one computer sends data communications to another computer, directly or through a data communications network. Examples of the communications adapter 146 suitable for use in the computer 110 include, but are not limited to, modems for wired dial-up communications, Ethernet (Institute of Electrical and Electronics Engineers (IEEE) 802.3) adapters for wired network communications, and IEEE 802.11 adapters for wireless network communications. The computer 110 also includes a display adapter 132 which facilitates data communication between the bus adapter 118 and a display device 130, enabling the application 120 to visually present output on display device 130.

Figure 2:
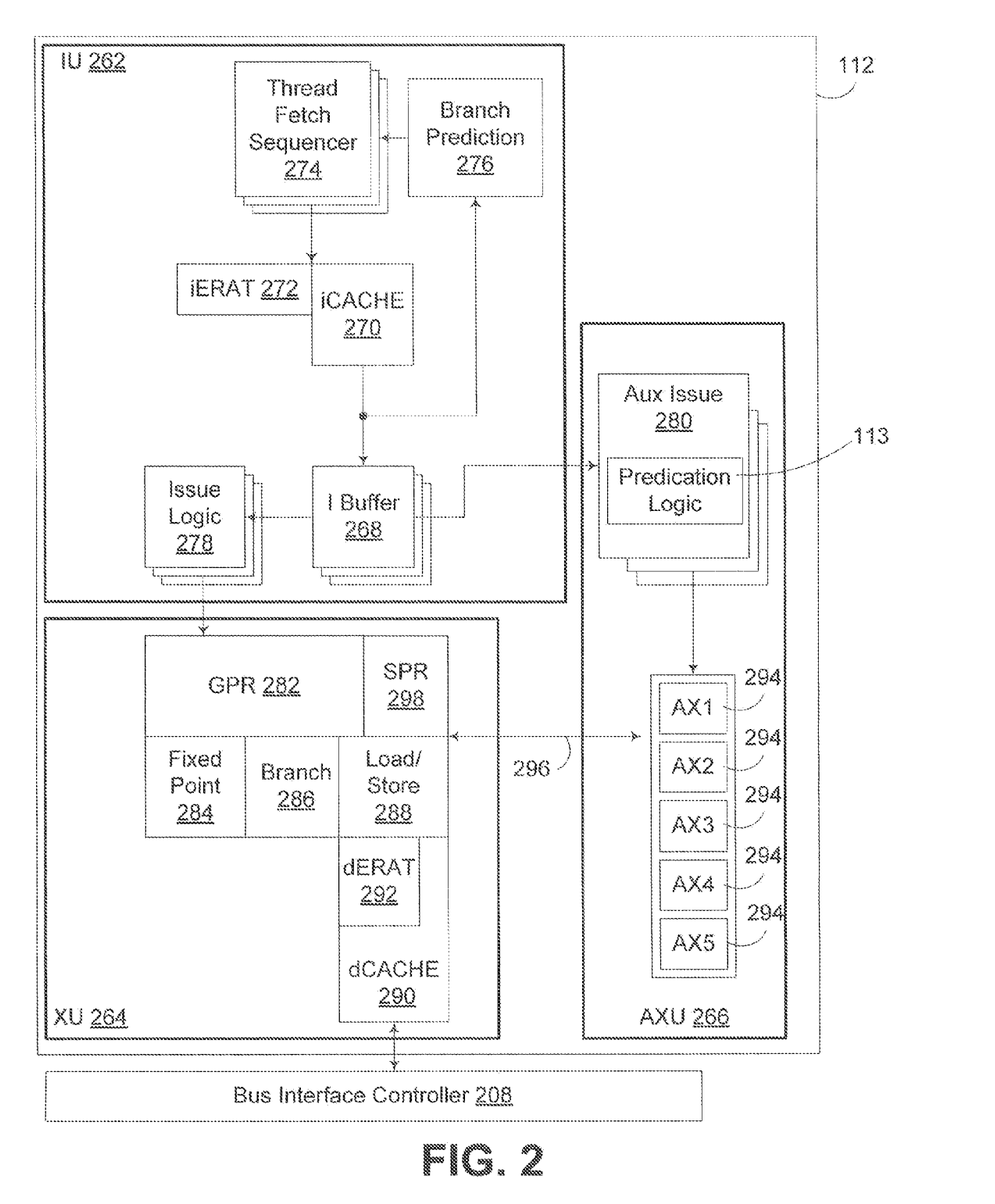
FIG. 2 is a block diagram illustrating in greater detail an exemplary implementation of the processor in FIG. 1.

FIG. 2 illustrates one exemplary implementation of the processor 112 consistent with disclosed embodiments. In FIG. 2, the processor 112 is implemented as a processing element partitioned into an instruction unit (IU) 262, an execution unit (XU) 264 and an auxiliary execution unit (AXU) 266. In the illustrated implementation, the IU 262 includes a plurality of instruction buffers (I Buffers) 268 that receive instructions from an L1 instruction cache (iCACHE) 270. Each instruction buffer 268 is dedicated to one of a plurality, e.g., four, symmetric multithreaded (SMT) hardware threads. An effective-to-real translation unit (iERAT) 272 is coupled to the iCACHE 270, and is used to translate instruction fetch requests from a plurality of thread fetch sequencers 274 into real addresses for retrieval of instructions from lower order memory, through a bus interface controller 208. Each thread fetch sequencer 274 is dedicated to a particular hardware thread, and is used to ensure that instructions to be executed by the associated thread are fetched into the iCACHE 270 for dispatch to the appropriate execution unit. Further, as shown in FIG. 2, instructions fetched into the instruction buffer 268 may also be monitored by branch prediction logic 276, which provides hints to each thread fetch sequencer 274 to minimize or reduce instruction cache misses resulting from branches in executing threads.

The IU 262 also includes a plurality of issue logic blocks 278 and is configured to resolve dependencies and control the issue of instructions from instruction buffer 268 to the XU 264. In addition, in the illustrated embodiment, a plurality of separate auxiliary instruction issue logic blocks 280 is provided in the AXU 266, thus enabling separate instructions to be concurrently issued by different threads to the XU 264 and the AXU 266. In an alternative embodiment, (not illustrated) the auxiliary instruction issue logic 280 may be disposed in the IU 262, or may be omitted in its entirety, such that the issue logic 278 issues instructions to the AXU 266.

In a particular embodiment, the auxiliary instruction issue logic 280 includes the predication logic 113. The predication logic 113 may enable the predication of instructions based on address pattern matching. For example, when an instruction has an address that matches a specified address pattern, the execution of the instruction may be predicated and the instruction may be treated as a no-op. To illustrate, an address pattern of "0x00000010" (i.e., hexadecimal 10=binary "10000") may result in predication of instructions in a program code segment whose addresses end in the bit sequence "10000." In a particular embodiment, address pattern matching may be implemented via a mask register and a match register. For example, the mask register may indicate that all bits of an instruction address except the last five bits are to be ignored (e.g., the mask register may store hexadecimal 0x0000001F=binary "11111") and the match register may store the pattern "0x00000010."

The XU 264 is implemented as a fixed point execution unit, including a general purpose register (GPR) 282 and a special purpose register (SPR) 298 both coupled to fixed point logic 284, branch logic 286 and load/store logic 288. The load/store logic 288 is further coupled to an L1 data cache (dCACHE) 290, with effective-to-real translation provided by dERAT logic 292. The XU 264 may be configured to implement practically any instruction set, e.g., all or a portion of a 32-bit or 64-bit fixed or variable length instruction set, a very long instruction word (VLIW) instruction set, or any combination thereof.

The AXU 266 operates as an auxiliary execution unit including the auxiliary instruction issue logic 280 along with one or more execution blocks 294. The AXU 266 may include any number of execution blocks 294, and may implement practically any type of execution unit, e.g., a floating point unit, or one or more specialized execution units such as encryption/decryption units, generic coprocessors, cryptographic processing units, vector processing units, graphics processing units, Extensible Markup Language ("XML") processing units, etc. In the illustrated embodiment, the AXU 266 includes high speed auxiliary interface 296, to facilitate high speed communication between the AXU 266 and the XU 264, e.g., to support direct moves between AXU register contents and XU register contents and other high speed communication between execution units.

Figure 3:
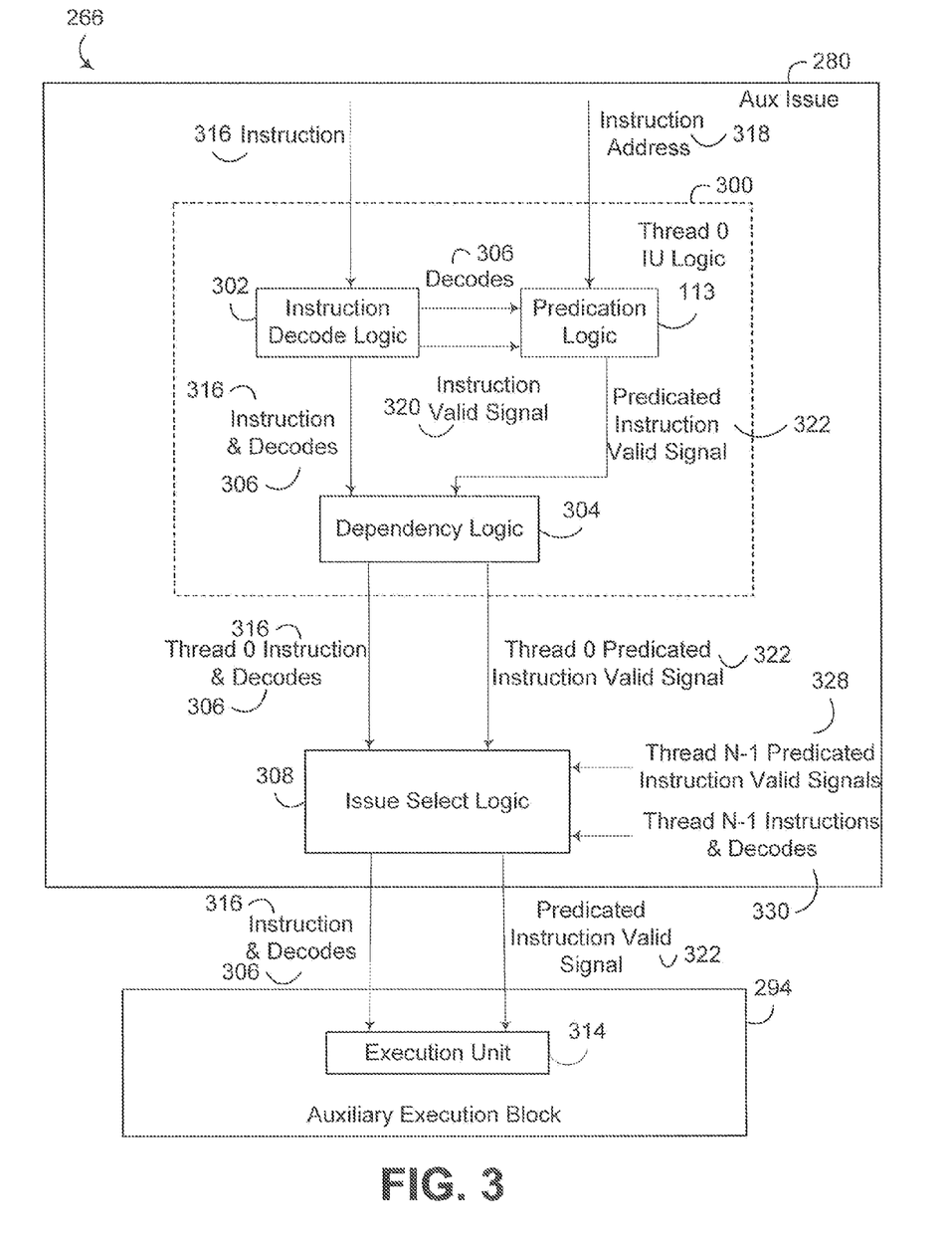
FIG. 3 is a block diagram illustrating an exemplary implementation of instruction issue and execution logic consistent with disclosed embodiments, and capable of being implemented within the processor of FIG. 2.

FIG. 3 illustrates an exemplary embodiment of the AXU 266 that may be suitable for implementation inside of the processor 112. The AXU 266 is configured with auxiliary instruction issue logic 280, which is configured to select fair issuance of instructions from multiple threads using issue select logic 308. The issue select logic 308 may issue instructions from the selected thread to the auxiliary execution block 294. The auxiliary instruction issue logic 280 is also configured to decode instructions for each thread with instruction decode logic 302. The instruction decode logic 302 decodes instructions from its associated thread to determine if an instruction 316 is valid and provides decodes 306 and an instruction valid signal 320 to the predication logic 113. In addition, instruction decode logic 302 provides the instruction 316 and the decodes 306 to dependency logic 304.

The predication logic 113 is configured to provide a predicated instruction valid signal 322 to the dependency logic 304 based on determining whether an instruction address 318 of the instruction 316 is within a range of addresses. The predicated instruction valid signal 322 may indicate whether the corresponding instruction 316 is to be executed. For example, when the instruction address 318 is within the range of addresses, the predicated instruction valid signal 322 may be de-asserted. Responsive to the de-asserted predicated instruction valid signal 322, the execution unit 314 may convert the instruction 316 into a no-op.

The dependency logic 304 is configured to resolve dependencies between instructions by stalling dependent instructions for the appropriate number of cycles, and passing the instruction 316 and associated predicated instruction valid signal 322 to issue select logic 308.

The issue select logic 308 is configured to select fair issuance of instructions from available threads in the design, and issue the instructions 316 and associated predicated instruction valid signals 322 to the auxiliary execution block 294. The auxiliary execution block 294 includes an execution unit 314.

The auxiliary execution block 294 is configured to obtain the instructions 316 from the issue select logic 308 and the associated predicated instruction valid signals 322, and provide them to the execution unit 314. The execution unit 314 may be implemented as a number of different types of execution units, e.g., floating point units, fixed point units, or specialized execution units such as graphics processing units, encryption/decryption units, coprocessors, XML processing units, etc, and still remain within the scope and spirit of the present disclosure.

The execution unit 314 may performs one or more operations (e.g., addition, subtraction, division, etc) depending on the type of instruction issued from the issue select logic 308 and depending on the predicated instruction valid signal 322.

In a multithreaded design consistent with disclosed embodiments, one group 300 of the instruction decode logic 302, the predication logic 113, and the dependency logic 304 may exist for each thread. Alternatively, other embodiments may be implemented in a single threaded design, where only a single thread is issued to one group 300 of the instruction decode logic 302, the predication logic 113, and the dependency logic 304, and only one group 300 may exists in the design.

Figure 4:
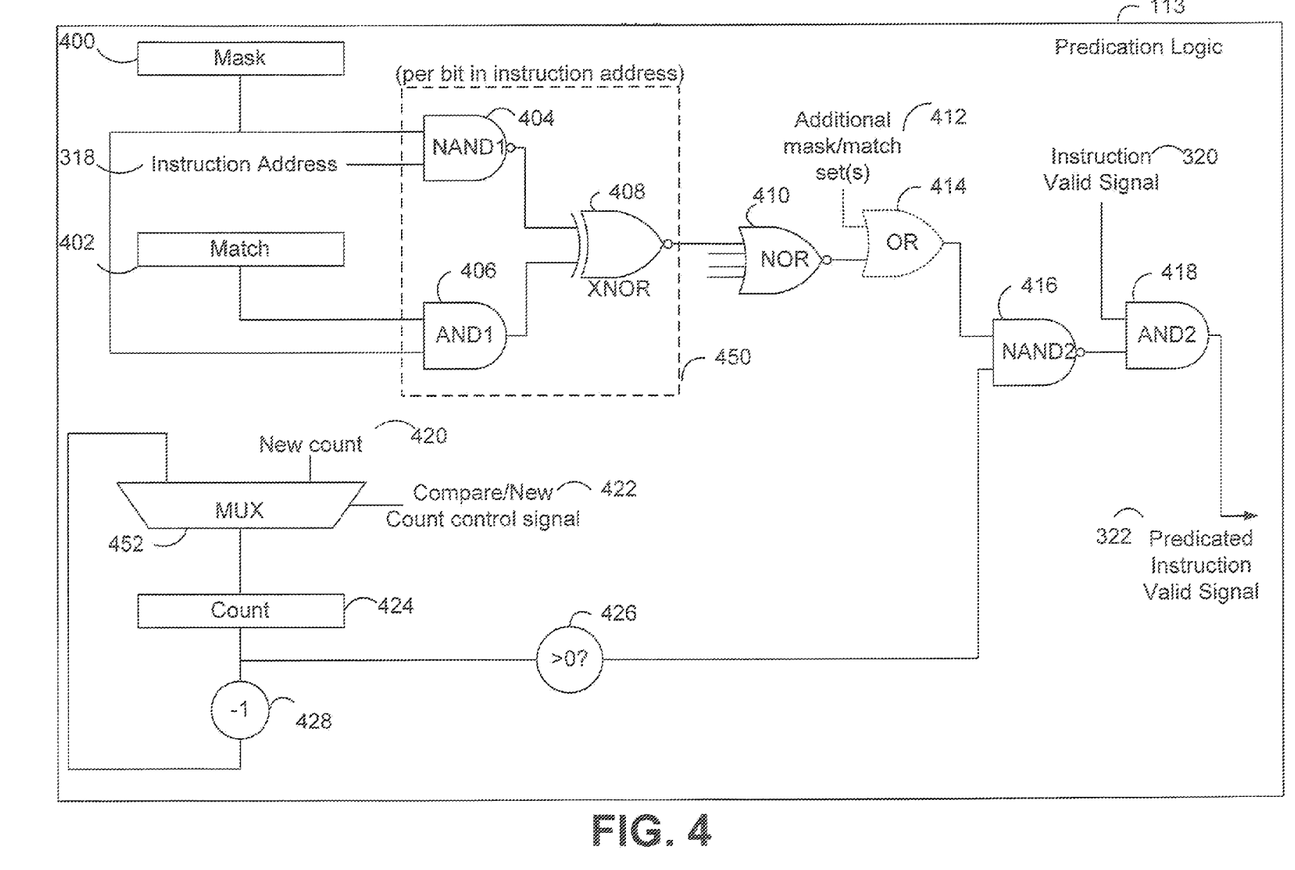
FIG. 4 is a block diagram of a predication logic consistent with disclosed embodiments, and capable of being implemented within the processor of FIG. 2.

FIG. 4 illustrates a particular embodiment of the predication logic 113, previously illustrated and described with reference to FIGS. 1-3. As illustrated in FIG. 4, predication logic 113 may include a mask register 400 and a match register 402.

The match register 402 may store an address pattern corresponding to a range of addresses to be predicated. For example, when a program code segment starts at address 0 and each instruction is four bytes long, the fifth instruction may begin at byte 16. To predicate that instruction and every eighth instruction thereafter, the match register 402 may store the address pattern 0x00000010.

The mask register 400 may store a value (e.g., binary value) that identifies which one or more bits of an instruction address 318 are to be compared to the address pattern stored in the match register 402, and which one or more bits of the instruction address 318 are to be ignored. For example, when the match register 402 stores the address pattern "0x00000010," the mask register 400 may store a value "0x0000001F." A particular example of predication of selected instructions in a code segment, and associated mask/match values to achieve such predication, is further described with reference to FIG. 7.

During operation, each corresponding bit of the mask register 400, the match register 402, and the instruction address 318 may be compared via a corresponding comparison unit 450. Separate comparison units may exist for each bit in the instruction address 318. Within each comparison unit 450, a particular bit of the value stored in the mask register 400 and a corresponding bit of the instruction address 318 may be provided to a first NAND gate (NAND1) 404. Collectively, outputs of NAND1 404 from each comparison unit 450 may represent desired bits of the instruction address 318 in inverted form. Further, within the comparison unit 450, a particular bit from the mask register 400 and a corresponding bit from the match register 402 may be provided to a first AND gate (AND1) 406. Collectively, the outputs of AND1 406 may represent desired match bits (i.e., the bits of the address pattern that are to be matched). Within each comparison unit 450, the outputs of NAND1 404 and AND1 406 may be provided to an XNOR gate 408.

The output of the XNOR gate 408 in each comparison unit 450 may be provided to a NOR gate 410. In a particular embodiment, multiple address patterns may be checked when determining whether a particular instruction is to be predicated. In such an embodiment, multiple mask/match register set(s) 412 may exist within the predication logic 113. That is, the predication logic 113 may include a plurality of match registers storing a plurality of address patterns, and determining whether the instruction address 318 is within a range of addresses may include determining whether one or more bits of the instruction address 318 match at least one of the plurality of address patterns. Corresponding NOR gate outputs from each mask/match set may be input into an OR gate 414. An output of the OR gate 414 may signal whether or not the instruction corresponding to the instruction address 318 is to be predicated.

In a particular embodiment, the predication logic 113 may support advanced address patterns. For example, in addition to matching specific bit patterns, the predication logic 113 may also support starting or stopping instruction predication after a specific number of instructions have been considered. To illustrate, the predication logic 113 may include a count register 424 connected between a multiplexer (MUX) 452, a decrementer 428, and a greater than comparator 426, as illustrated. The MUX 452 may receive a control signal 422 that indicates whether a new count 420 or a decremented count output by the decrementer 428 is to be stored in the count register 424. To illustrate operation of the count register 424, consider a situation in which instruction predication is to be performed for the next 32 instructions, and then turned off. To implement this case, the new count 420 may be set to 32 and stored in the count register 424. The control signal 422 may then be switched and the value in the count register 424 may be compared to zero via the comparator 426. For the next 32 instructions, the comparator 426 may output "TRUE" (e.g., binary 1), which may be provided to a second NAND gate (NAND2) 416 along with the output of the OR gate 414. The output of NAND2 416 may be ANDed with the instruction valid signal 320 via a second AND gate (AND2) 418, thereby yielding the predicated instruction valid signal 322. When the predicated instruction valid signal 322 is de-asserted (e.g., binary 0 or "FALSE") the instruction corresponding to the instruction address 318 may be predicated (e.g., treated as a no-op). After 32 instructions have been processed by the predication logic 113, the comparator 426 will output a "FALSE" value, effectively disabling instruction predication by setting the predicated instruction valid signal 322 equal to the instruction valid signal 320. Thus, when the comparator 426 outputs "FALSE," instructions may be executed independently of whether the instructions have addresses that match the address pattern indicated in the match register 402.

Thus, FIG. 4 illustrates a particular embodiment of instruction predication that includes preventing execution of an instruction based on both address pattern matching as well as on determining whether a value stored in a count register (e.g., the count register 424) is greater than zero. Moreover, the logic controlling the mask and match process may be performed quickly relative to a clock cycle time period, and may thus be performed at instruction decode time. This may enable for the performance benefits of instruction predication feature while also freeing up valuable opcode space for other instructions and register addresses.

Figure 5:
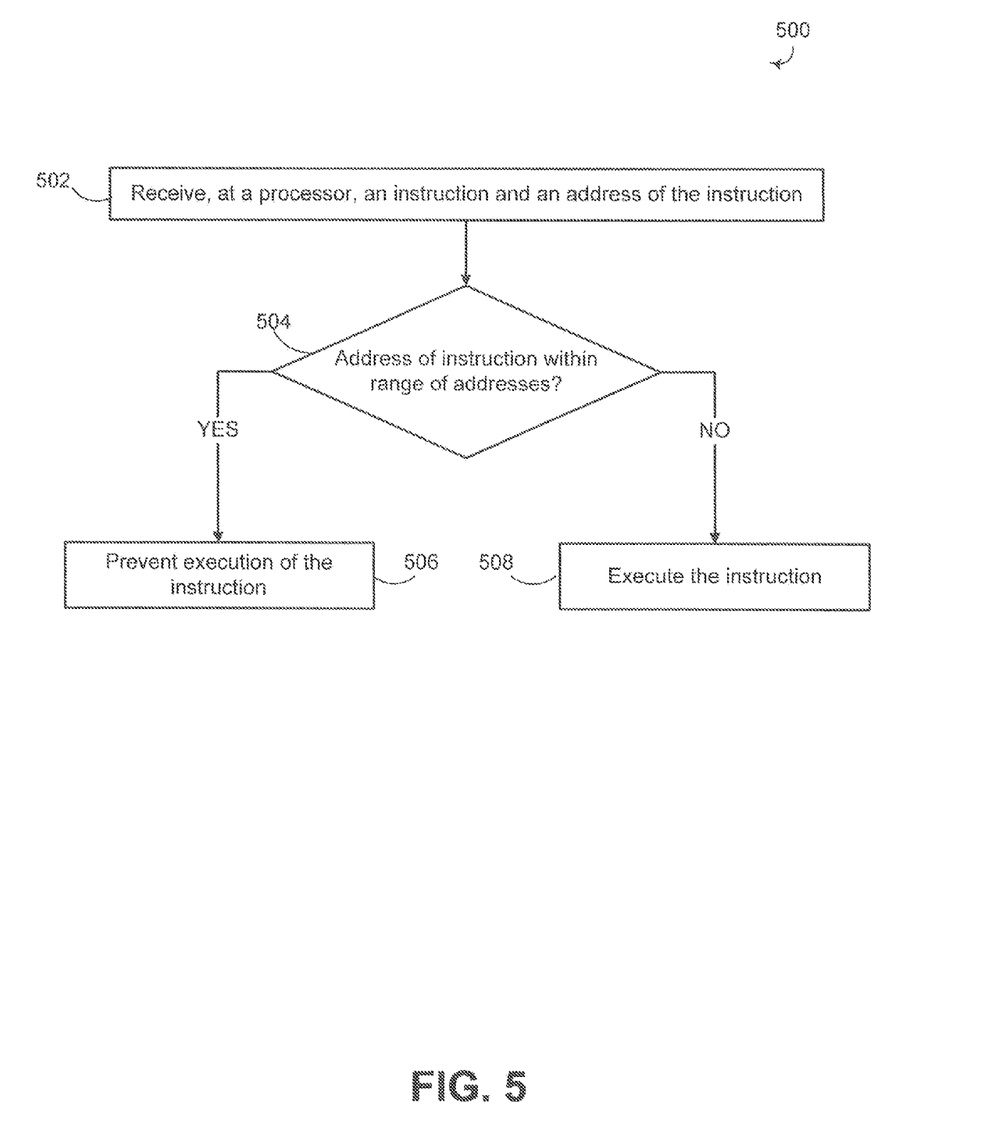
FIG. 5 is a flow chart illustrating a first exemplary sequence of operations performed by the auxiliary instruction issue and execution logic of FIG. 3 to implement instruction predication using an instruction and an address of the instruction consistent with disclosed embodiments.

FIG. 5 illustrates a particular embodiment of a method 500 outlining a sequence of operations performed by the auxiliary execution unit 266 of FIG. 2 to selectively predicate instruction execution based on address pattern matching. In an illustrative embodiment, the method 500 may be illustrated with reference to FIG. 3.

With this sequence of operations, an instruction and an address of the instruction are received, at 502. For example, referring to FIG. 3, the logic 300 may receive the instruction 316 and the address 318.

Continuing to 504, a determination is made as to whether the address is within a range of addresses. When it is determined at 504 that the address is within the range of addresses, execution of the instruction is prevented (i.e., predicated), at 506. For example, referring to FIG. 3, the predication logic 113 may de-assert the predicated instruction valid signal 322 to prevent execution of the instruction 316. When the address is outside the range of addresses, the method 500 includes executing the instruction, at 508. For example, referring to FIG. 3, the execution unit 314 may execute the instruction 316.

Figure 6:
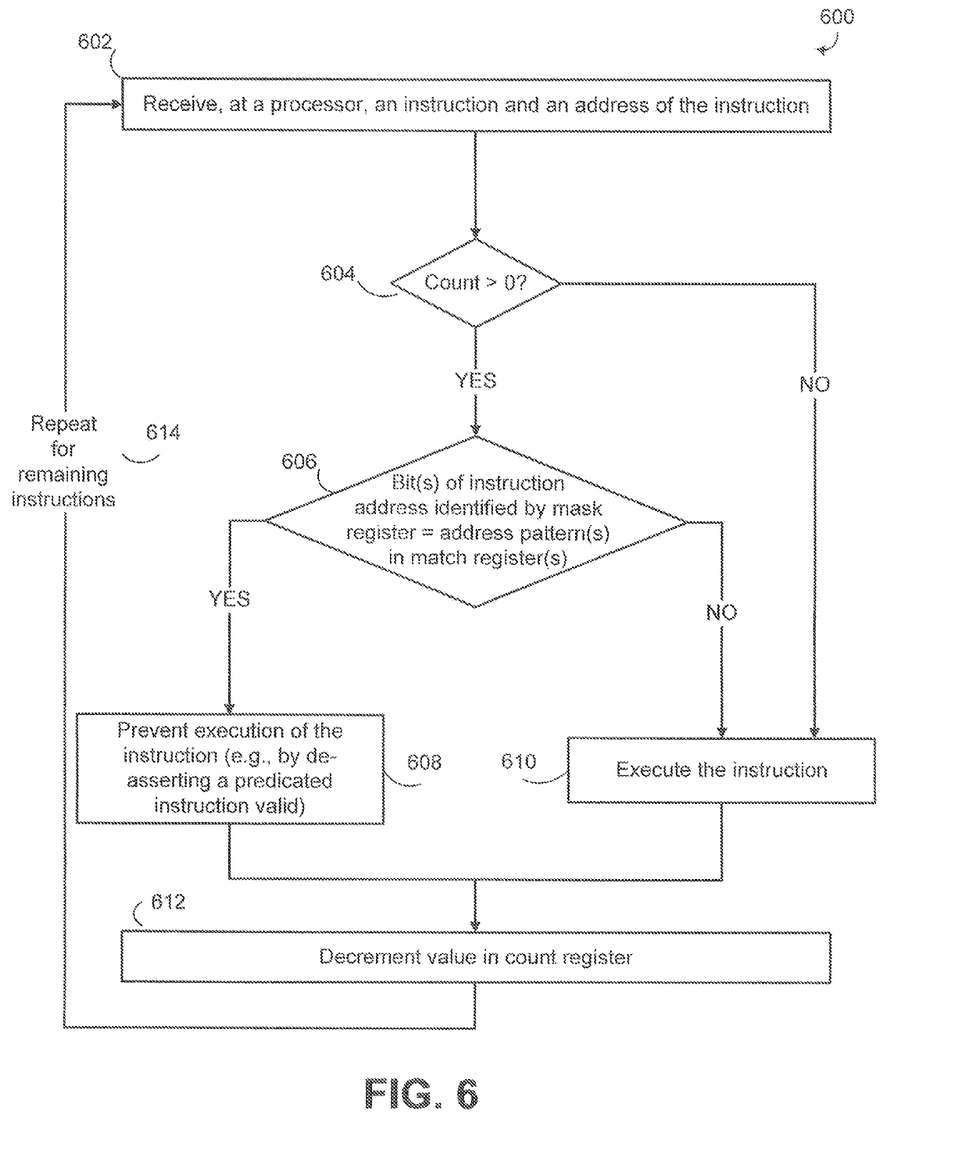
FIG. 6 is a flow chart illustrating a second exemplary sequence of operations performed by the auxiliary instruction issue and execution logic of FIG. 3 to implement instruction predication using an instruction and an address of the instruction consistent with disclosed embodiments.

FIG. 6 illustrates another particular embodiment of a method 600 outlining a sequence of operations performed by the auxiliary execution unit 266 of FIG. 2 to selectively predicate instruction execution based on address pattern matching. In an illustrative embodiment, the method 600 may be illustrated with reference to FIG. 4.

With this sequence of operations, an instruction and an address of the instruction are received, at 602. For example, referring to FIG. 4, the predication logic 113 may receive the instruction address 318 corresponding to the instruction 316 of FIG. 3.

Advancing to 604, a determination is made as to whether a count is greater than 0. For example, referring to FIG. 4, the comparator 426 may determine whether the value stored in the count register 424 is greater than zero. When the count is greater than 0, the method 600 includes determining whether one or more bits of the address identified by a mask register match one or more address patterns stored in one or more match registers, at 606. For example, referring to FIG. 4, whether bits of the address 318 identified by the mask register 400 match the match register 402 may be determined via the various logic gates 404-414.

If a determination is made at 606 that the one or more bits of the address match one or more address patterns stored in one or more match registers, then the method 600 includes preventing execution of the instruction, at 608. For example, preventing execution of the instruction may include de-asserting a predicated instruction valid signal. To illustrate, with reference to FIG. 4, the predicated instruction valid signal 322 may be de-asserted. The method 600 then advances to 612, where the count is decremented, and then returns to 602 to consider the next incoming instruction in the instruction stream. For example, referring to FIG. 4, the count may be decremented via the decrementer 428.

If a determination is made at 606 that the one or more bits of the address do not match any address pattern, or if a determination is made at 604 that the count is less than or equal to zero, then the method 600 includes executing the instruction without predication, at 610. For example, referring to FIG. 4, the predicated instruction valid signal 322 may be equal to the instruction valid signal 320, and the instruction may be executed when the instruction valid signal 320 is "TRUE."

Figure 7:
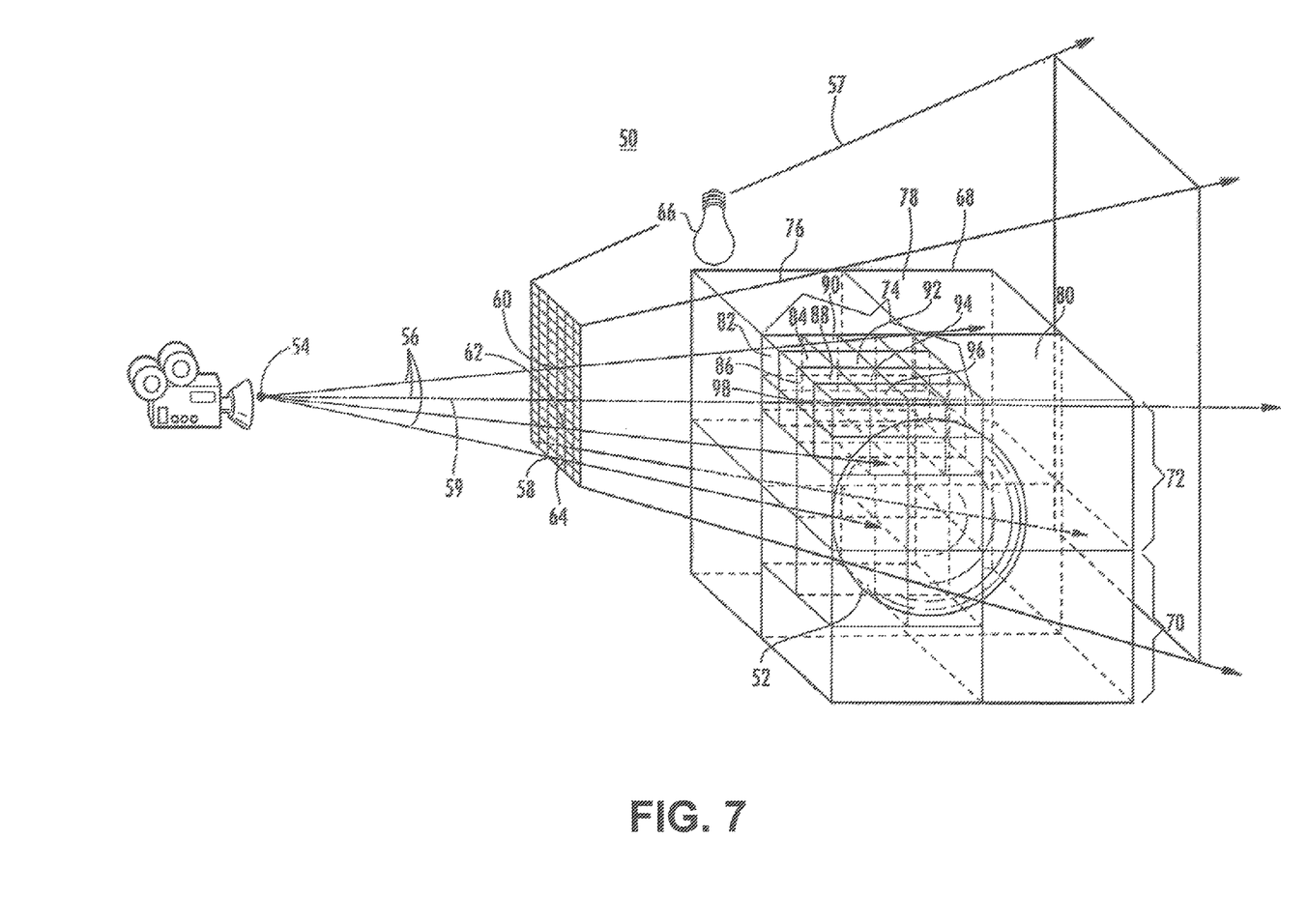
FIG. 7 is a logical representation of a rendering system whose operation may be improved via instruction predication based on address pattern matching as disclosed herein.

Referring now to FIG. 7, a logical representation of a system to render a three-dimensional image is depicted and generally designated 50. In a particular embodiment, operation of the system 50 may be improved via instruction predication based on address pattern matching as described with reference to FIGS. 1-6. The system 50 depicts bounding volumes having sizes that vary according to their respective distances from a reference. The system 50 includes an object 52 viewed by an observer as represented by ray origin 54. The origin 54 may be associated with a camera viewpoint for a given frame.

Rays 56 extending from the ray origin 54 may create a perspective view of the object 52. The rays 56 may have properties and behavioral qualities that are similar to light rays. The rays 56 may intersect a pixel plane 58 that includes multiple pixels. A pixel (i.e., a picture element) may be considered the smallest piece of information in a three-dimensional image. Pixels may be arranged in a two-dimensional grid. Each pixel may be a sample of an original image and may include color components. The pixel plane 58 may be rendered as a two-dimensional image by an image processing system. The resultant two-dimensional image may be displayed at a display device. The display device may use pixels of different colors to render the two-dimensional image.

One of the rays 56 may traverse the system 50 and the pixel plane 58. Pixels 60, 62, 64 may represent intersections of the rays 56 with the object 52. The object 52 may include part of a three-dimensional image to be rendered by an image processing system. While only a single object 52, i.e., a sphere, is shown in FIG. 7, additional objects (not shown) may be present. Each of the objects may be represented by primitives.

The object 52 and the surrounding space may be divided into bounding volumes that correspond to nodes of a spatial data structure. For example, a large bounding volume 68 may correspond to a first node of a spatial data structure that represents the entire viewable three-dimensional image. The three-dimensional image may be divided into portions via bounding volumes. For example, the bounding volume 68 may be divided into bounding volumes 70 and 72. The bounding volumes 70 and 72 may be further divided into bounding volumes 74, 76, 78, and 80, each of which roughly correspond to a quarter of the bounding volume 68. The bounding volumes 74, 76, 78, and 80 may be further subdivided into smaller bounding volumes. For example, the bounding volume 74 may be further subdivided into smaller bounding volumes 82, 84, 86, 88, 90, 92, 94, 96, and 98. In a particular embodiment, the virtual space may be divided into different sized bounding volumes using other types of algorithms. In a particular embodiment, the relative sizes of the bounding volumes may be modified according to their respective distances from a reference. For example, the ray origin 54 may be a reference. Other references may include a point within the image data, such as a portion of a ray. In another embodiment, a reference may include a ray 59 that corresponds to a center of a view frustum 57. Still another reference may include the view frustum 57 or boundary of the view frustum 57. The bounding volumes closest to the reference (e.g., the bounding volumes 82, 84, 86, 88, 90, 92, 94, and 96) may be smaller than the bounding volumes that are farther from the reference (e.g., the bounding volumes 52, 70).

The view frustum 57 may include a region of space in a modeled world (i.e., the three-dimensional image) that is viewable by a viewer. The view frustum 57 may represent the field of view of a notional camera. The exact shape of this region may vary based on a type of camera lens that is being simulated. In FIG. 7, the view frustum 57 is depicted as a rectangular pyramid. The planes that cut the view frustum 57 perpendicular to the viewing direction may be referred to as the near plane and the far plane. Objects that are closer to the ray origin 54 than the near plane or beyond the far plane may not be drawn.

FIG. 7 also shows a light source 66. The light source 66 may illuminate the object 52. Depending on the location of the light source 66 and the object 52, the light source 66 may cause shadows to be cast onto other objects (not shown) within the scene. In a particular embodiment, the pixel plane 58 may include millions of pixels. Each individual pixel may display a different color to render the two-dimensional picture on a display device. A ray tracing algorithm may calculate the colors that the rays 56 encounter in the system 50. An image processing system may assign colors encountered to the pixels 60, 62, and 64 of FIG. 7 when one or more of the rays 56 passes through the pixels 60, 62, and 64 on its way from the origin 54 to the object 52.

Where more than one ray intersects a pixel, the color of the pixel may be determined based on combining a color contribution from each of the rays that intersect the pixel. Another pixel may have a single ray intersect the pixel, resulting in the single ray determining the resulting color of the pixel. Some pixels may not be intersected by any of the rays issued by the image processing system, in which case their color may be determined, approximated or assigned by algorithms within the image processing system. For example, if a ray does not intersect an object within the scene it may be assigned a default background color, e.g., approximating the color of the sky.

Many factors may contribute to the color of the object 52 struck by the rays 56. For example, the light source 66 within the three-dimensional scene may illuminate the object 52. In addition, physical properties of the object 52 may contribute to the color of the object 52. For example, when the object 52 is reflective or transparent, other non-light source objects (not shown) may also contribute to the color of the object 52. To illustrate, a first object with a reflective surface may reflect a portion of a second object that is located near the first object, thereby contributing to a color of the reflective surface of the first object.

To determine the effect of a ray intersecting the object 52 on other objects (not shown) located near the object 52, secondary rays may be issued from the point where an original ray intersects the object 52. For example, one type of secondary ray may be a shadow ray. A shadow ray may be used to determine the contribution of light at the point where the original ray intersects the object 52. The shadow ray may be traced from a point of intersection of an original ray and the object 52 to the light source 66. When the original ray reaches the light source 66 without encountering another object, the light source 66 may illuminate the object 52 struck by the original ray at the point where the original ray struck the object 52. When the object 52 is translucent or transparent, the light source 66 may illuminate the object 52 at the point where the original ray 56 struck the object 52. The total contribution of color and light of all secondary rays (e.g., shadow rays, transmitted rays, reflected rays, etc.) may contribute to the final color of the pixel through which the original ray passes.

A second type of secondary ray may be a transmitted ray. A transmitted ray may be used to determine what color light may be transmitted through the body of the object 52. A ray data structure representation of a transmitted ray may be created by the image system when the object 52 intersected by the original ray has transparent or translucent properties. For instance, when the object includes colored glass, a transmitted ray intersecting the glass may be colored based on the color of the glass at the point at which the transmitted ray emerges from the colored glass. A transmitted ray may traverse through the object 52 at an angle relative to the angle at which the original ray struck the object 52.

A third type of secondary ray may be a reflected ray. A reflected ray may be used to depict color or light that is reflected by the object 52. When the object 52 has reflective properties, such as a metal surface, a reflected ray may be issued to depict color or light that is reflected by the object 52 on to other objects (not shown). Reflected rays may traverse away from the object 52 at an angle relative to the angle at which the original ray intersects the object 52.

Thus, by tracing the rays 56 through a three-dimensional image, additional details can be added, such as shadows and reflections, to enable the three-dimensional image to be rendered in a photo realistic manner. In a particular embodiment ray tracing in the system 50 of FIG. 7 may also include or be followed by pixel shading, which may be performed via an iterative function consistent with the following code (in which iterations have been "unrolled" into successive code portions):

```
pixel0:
lfsx     prev_z0, r_zb, r_i    # load pre z value
vaddfp   bcc, bcc, bcci        # update barycentric coords
vdot3fp  new_z0, bcc, z0       # calculate z for new pixel
cmpi     zflag, 1
bneq     n0
fcmp     prev_z0, new_z0
bge      pixel1                #skip if new pixel is behind a pre drawn one
n0:
stfsx    new_z0, r_zb, r_i     # store to zbuffer
stvx     color_z0, r_cb, r_i   # store the color to the color buffer
addi     r_i, r_i, 4           # update the zbuffer pointer
pixel1:
lfsx     prev_z1, r_zb, r_i    # load pre z value
vaddfp   bcc, bcc, bcci        # update barycentric coords
vdot3fp  new_z1, bcc, zl       # calculate z for new pixel
cmpi     zflag, 1
bneq     n1
fcmp     prev_z1, new_z1
bge      pixel2                # skip if new pixel is behind a prev drawn one
n1:
stfsx    new_z1, r_zb, r_i     # store to zbuffer
stvx     color_z1, r_cb, r_i   # store the color to the color buffer
addi     r_i, r_i, 4           # update the zbuffer pointer
pixel2:
lfsx     prev_z2, r_zb, r_i    # load prev z value
vaddfp   bcc, bcc, bcci        # update barycentric coords
vdot3fp  new_z2, bcc, z2       # calculate z for new pixel
cmpi     zflag, 1
bneq     n2
fcmp     prev_z2, new_z2
bge      pixel3                # skip if new pixel is behind a prev drawn one
n2:
stfsx    new_z2, r_zb, r_i     # store to zbuffer
stvx     color_z2, r_cb, r_i   # store the color to the color buffer
addi     r_i, r_i, 4           # update the zbuffer pointer
pixel3:
lfsx     prev_z3, r_zb, r_i    # load prev z value
vaddfp   bcc, bcc, bcci        # update barycentric coords
vdot3fp  new_z3, bcc, z3       # calculate z for new pixel
cmpi     zflag, 1
bneq     n3
fcmp     prev_z3, new_z3
bge      pixel4                # skip if new pixel is behind a prev drawn one
n3:
stfsx    new_z3, r_zb, r_i     # store to zbuffer
stvx     color_z3, r_cb, r_i   # store the color to the color buffer
addi     r_i, r_i, 4           # update the zbuffer pointer
```

As illustrated by the above code, pixel shading may include a large number of branches, which may cause branch mispredicts and impact overall performance of the system 50. In particular, the above code performs triangle rasterization during pixel shading. The code performs the following tasks in support of rasterizing 4 pixels in succession: load a previous z-buffer value for a location, calculate barycentric coordinates, calculate a z-depth for the new pixel, check whether z-buffer testing is enabled, and when z-buffer testing is enabled, check whether the new pixel is closer to the camera than the old one. Each iteration of the ray tracing algorithm involves a branch based on "zflag," which may indicate whether z-buffer testing is enabled. Typically, z-buffer testing, which checks whether a current pixel is "behind" a previous pixel, will either be enabled or disabled throughout a ray tracing session, so repeatedly checking the zflag may not be efficient. To improve performance of the ray tracing algorithm, the code may instead be re-written (e.g., automatically by a compiler) to leverage the address-based predication techniques disclosed herein:

```
cmpi
beq             zflag, 1
ztest_disabled: pixel0
mtpmask         0x0000001F    # consider 5 least significant bits of an address
mtpmatch        0x00000010    # look for addresses ending in "10000"
mtpctr          8*4           # determine predication for the next 32 instructions
pixel0:
00   lfsx     prev_z0, r_zb, r_i   # load prev z value
04   vaddfp   bcc, bcc, bcci       # update barycentric coords
08   vdot3fp  new_z0, bcc, z0      # calculate z for new pixel
0C   fcmp     prev_z0, new_z0
10   bge      pixel1               # skip if new pixel is behind prev drawn one
14   stfsx    new_z0, r_zb, r_i    # store to zbuffer
18   stvx     color_z0, r_cb, r_i  # store the color to the color buffer
1C   addi     r_i, r_i, 4          # update the zbuffer pointer
```

```
pixel1:
20       lfsx      prev_z1, r_zb, r_i     # load prev z value
24       vaddfp    bcc, bcc, bcci          # update barycentric coords
28       vdot3fp   new_z1, bcc, z1         # calculate z for new pixel
2C       fcmp      prev_z1, new_z1
30       bge       pixel2                  # skip if new pixel is behind prev drawn one
34       stfsx     new_zl, r_zb, r_i       # store to zbuffer
38       stvx      color_zl, r_cb, r_i     # store the color to the color buffer
3C       addi      r_i, r_i, 4             # update the zbuffer pointer
pixel2:

40       lfsx      prev_z2, r_zb, r_i     # load prev z value
44       vaddfp    bcc, bcc, bcci          # update barycentric coords
48       vdot3fp   new_z2, bcc, z2         # calculate z for new pixel
4C       fcmp      prev_z2, new_z2
50       bge       pixel3                  # skip if new pixel is behind prev drawn one
54       stfsx     new_z2, r_zb, r_i       # store to zbuffer
58       stvx      color_z2, r_cb, r_i     # store the color to the color buffer
5C       addi      r_i, r_i, 4             # update the zbuffer pointer
pixel3:

60       lfsx      prev_z3, r_zb, r_i     # load prev z value
64       vaddfp    bcc, bcc, bcci          # update barycentric coords
68       vdot3fp   new_z3, bcc, z3         # calculate z for new pixel
6C       fcmp      prev_z3, new_z3
70       bge       pixel4                  # skip if new pixel is behind prev drawn one
74       stfsx     new_z3, r_zb, r_i       # store to zbuffer
78       stvx      color_z3, r_cb, r_i     # store the color to the color buffer
7C       addi      r_i, r_i, 4             # update the zbuffer pointer

# 32 instructions have now been considered, so predication checking will stop
```

In the above code, instructions are 4 bytes long and start at the italicized hexadecimal addresses preceding the instructions. When z-buffer testing is disabled, instruction predication based on address pattern matching may result in skipping execution of the underlined branch instructions, which may improve an overall performance of the system 50 of FIG. 7.

As will be appreciated by one skilled in the art, aspects of the present disclosure may be embodied as a system, a method, a computer program product, or in other manners. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "logic," "module," or "system." Furthermore, aspects of the present disclosure may take the form of a computer program product embodied in one or more computer readable medium(s) having computer-readable program code embodied thereon.

Any combination of one or more computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction performing system, apparatus, or device. A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction performing system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA (JAVA is a registered trademark of Sun Microsystems), Smalltalk, C++ or the like and conventional procedural programming languages, such as the "C" programming language or similar programming languages. The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems) and computer programs according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which perform via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which perform on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more performable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. Example embodiments may be performed with or without query processing.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method, comprising:
    initializing a count register based on a number of instruction predication operations to be performed, wherein the count register is characterized by a value;
    altering the value of the count register according to the number of instruction predication operations performed;
    receiving, at a processor, an instruction and a source address of the instruction, wherein the instruction does not include a predicate register field;
    decoding the instruction;
    storing, by a match register, an address pattern corresponding to the range of addresses;
    identifying, by a mask register, one or more bits of the source address to be compared to the address pattern, wherein the identifying and decoding are performed within a clock cycle;
    determining that the one or more bits of the source address match the address pattern by, for each bit in the source address:
    performing a NAND operation on the bit in the source address and a corresponding bit in the mask register;
    performing an AND operation on the corresponding bit in the mask register and a corresponding bit in the match register;
    performing an XNOR operation on an output of the NAND operation and on an output of the AND operation; and
    selectively executing the instruction based on whether the source address is within a range of addresses and based on the value of the count register and the one or more bits of the source address matching the address pattern.

2. The method of claim 1, further comprising determining whether the source address is within the range of addresses based on the one or more bits of the source address matching the address pattern.

3. The method of claim 1, further comprising determining that the source address is within the range of addresses based on a determination that one or more bits of the source address match at least one of a plurality of address patterns, the plurality of address patterns stored at a plurality of match registers.

4. The method of claim 1, wherein selectively executing the instructing comprises executing the instruction based on a determination that the source address is outside the range of addresses, based on the number of instructions being greater than a threshold, and based on receipt of an instruction valid signal, wherein the instruction valid signal indicates that the instruction is valid, and wherein the source address identifies stored program code corresponding to the instruction.

5. The method of claim 1, wherein selectively executing the instruction comprises preventing execution of the instruction based on the source address being within the range of addresses and based on the value of the count register satisfying a threshold.

6. The method of claim 5, further comprising:
    receiving a second instruction;
    changing the value of the count register from the value to a second value in response to receiving the second instruction; and
    executing the second instruction independent of the range of addresses in response to determining that the second value is greater than or equal to the threshold.

7. The method of claim 1, wherein selectively executing the instruction comprises preventing execution of the instruction by de-asserting a predicated instruction valid signal that is input to an execution unit of the processor.

8. The method of claim 1, further comprising, after receiving the instruction, determining if the source address matches a particular address of the range of addresses.

9. The method of claim 1, further comprising:
receiving a second instruction;
determining whether the value satisfies a threshold;
executing the second instruction in response to the value satisfying the threshold; and
changing the count register in response to receiving the second instruction.

10. The method of claim 1, wherein altering includes decrementing the value of the count register.

11. An apparatus, comprising:
a match register; and
a processor configured to:
initialize a count register based on a number of instruction predication operations to be performed, wherein the count register is characterized by a value;
alter the value of the count register according to the number of instruction predication operations performed;
receive an instruction and a source address of the instruction, wherein the instruction does not include a predicate register field;
decode the instruction;
determine that the one or more bits of the source address match an address pattern by being configured to:
perform a NAND operation on a bit in the source address and a corresponding bit in the mask register;
perform an AND operation on the corresponding bit in the mask register and a corresponding bit in the match register;
perform an XNOR operation on an output of the NAND operation and on an output of the AND operation;
identify one or more bits of the source address to be compared to an address pattern, wherein the identifying and decoding are performed within a clock cycle; and
selectively execute the instruction based on the value of the count register and the one or more bits of the source address matching the address pattern.

12. The apparatus of claim 11, wherein the match register is configured to store the address pattern corresponding to the range of addresses.

13. The apparatus of claim 12, wherein the processor is further configured to determine that the one or more bits of the source address identified by the mask register match the address pattern.

14. The apparatus of claim 11, further comprising an execution unit configured to execute instructions responsive to a predicated instruction valid signal, wherein the controller is further configured to output the predicated instruction valid signal to the execution unit based on a determination that the source address is outside the range of addresses and based on a determination that the number of instructions received satisfies a threshold value of the count register.

15. The apparatus of claim 11, wherein the processor further comprises instruction decode logic configured to receive and decode the instruction.

16. A computer program product comprising a non-transitory computer readable storage medium having computer readable program code embodied therein, the computer readable program code configured to:
initialize a count register based on a number of instruction predication operations to be performed, wherein the count register is characterized by a value;
alter the value of the count register according to the number of instruction predication operations performed;
identify a source address of an instruction, wherein the instruction is received by a processor, and wherein the instruction does not include a predicate register field;
decode the instruction;
determine that the one or more bits of the source address match an address pattern by being configured to:
perform a NAND operation on a bit in the source address and a corresponding bit in the mask register;
perform an AND operation on the corresponding bit in the mask register and a corresponding bit in the match register;
perform an XNOR operation on an output of the NAND operation and on an output of the AND operation;
identify one or more bits of the source address to be compared to an address pattern, wherein the identifying and decoding are performed within a clock cycle; and
selectively execute the instruction based on the value of the count register and the one or more bits of the source address matching the address pattern.

17. The computer program product of claim 16, wherein the computer readable program code is further configured to execute the instruction when the source address is outside the range of addresses.

18. The computer program product of claim 16, wherein the computer readable program code is further configured to execute the instruction independent of the range of addresses in response to a determination that an indication of the number of instructions received satisfies a threshold value of the count register.

* * * * *